United States Patent [19]
Urban et al.

[11] Patent Number: 5,057,548

[45] Date of Patent: Oct. 15, 1991

[54] IMPINGEMENT MIXING APPARATUS

[75] Inventors: Franz Urban, Rohrdorf; Adolf Bauer, Olching, both of Fed. Rep. of Germany

[73] Assignee: Krauss-Maffei A.G., Fed. Rep. of Germany

[21] Appl. No.: 451,330

[22] Filed: Dec. 19, 1989

Related U.S. Application Data

[62] Division of Ser. No. 83,338, Aug. 10, 1987, Pat. No. 4,898,714.

[30] Foreign Application Priority Data

Dec. 8, 1986 [DE] Fed. Rep. of Germany ....... 3626990

[51] Int. Cl.$^5$ .............................................. C08G 18/14
[52] U.S. Cl. ..................................................... 521/170
[58] Field of Search .......................................... 521/170

[56] References Cited

U.S. PATENT DOCUMENTS

| | | | |
|---|---|---|---|
| 3,775,128 | 8/1975 | Schluter | 528/76 |
| 4,053,283 | 10/1977 | Schneider et al. | 528/88 |
| 4,141,470 | 2/1979 | Schulte et al. | 528/45 |
| 4,175,874 | 11/1979 | Schneider | 528/64 |
| 4,226,543 | 10/1980 | Schluter | 528/80 |
| 4,279,517 | 7/1981 | Wallner et al. | 528/61 |
| 4,379,122 | 4/1983 | Taubenmann | 528/71 |
| 4,442,070 | 4/1984 | Preksa et al. | 528/71 |
| 4,464,056 | 8/1984 | Schmitz et al. | 528/71 |
| 4,497,579 | 2/1985 | Schmitz et al. | 528/85 |
| 4,592,657 | 6/1986 | Taubenmann | 528/71 |
| 4,721,602 | 1/1988 | Weitzel | 528/61 |

FOREIGN PATENT DOCUMENTS 3120482 5/1981 Fed. Rep. of Germany .

Primary Examiner—Maurice J. Welsh
Attorney, Agent, or Firm—Fulbright & Jaworski

[57] ABSTRACT

An impingement mixing device is provided comprising a mixing chamber housing, a control piston axially displaceable within said mixing chamber housing between an extended position and a retracted position, a mixture chamber within the housing defined by an end face of the control piston when in the retracted position and a mixing chamber discharge outlet coextensive with an end face of said control piston when in the extracted position, means to feed first and second components to the mixing chamber in opposing relationship, a discharge tube housing defining a quieting chamber having an opening at a discharge end and in fluid communication with the mixing chamber, with said discharge tube housing including a sealing means adapted to at least partially close the opening of the quieting chamber at the discharge end.

11 Claims, 4 Drawing Sheets

IMPINGEMENT MIXING APPARATUS

This is a division application of Ser. No. 083,338, filed Aug. 10, 1987, now U.S. Pat. No. 4,898,714.

BACKGROUND OF THE INVENTION

The invention concerns an apparatus for the mixing of at least two reactive components.

In the mixing of reactive components such as, for example, isocyanate and polyol during the preparation of polyurethane foam, via high pressure impingement mixing, air bubbles appear at the onset which during the filling of the mixing chamber are incorporated in the component mixture which exits at a high velocity. If the mixing chamber opens into a discharge tube or chamber extending at right angles to the axis of the mixing chamber (a so-called angular or deflecting mixing head), additional air may be introduced into the component mixture.

OBJECTS AND SUMMARY OF THE INVENTION

The object of the present invention is thus to provide an apparatus of the aforementioned type whereby the inclusion of air in the component mixture may be avoided in a simple manner.

The present invention is based on the concept of closing off the discharge opening of the discharge or quieting chamber of the mixing device immediately following the completion of an injection "shot" by means of a sealing means in the form of a slide, whereby the discharge chamber which is filled with air according to the state of the art is filled with the reaction mixture, as said mixture cannot flow from the discharge chamber into the mold. The slide is moved synchronously with a control and cleaning piston in the mixing chamber, so that upon completion of the ejection stroke of the control and cleaning piston (when the next "shot" is effected upon clearance of the injection orifices) the slide has again completely cleared the opening of the discharge tube. The reaction mixture formed during the subsequent "shot" thus enters and expands into the discharge chamber which contains the mixture formed and retained during the preceding "shot", with the advantageous result that any turbulence and formation of air bubbles are avoided since the chamber into which the reaction mixture is passed is devoid of air.

Alternatively, the slide may also be used to throttle the discharge tube during the injection of the components, whereby a completely uniform coloration of the reaction mixture may be obtained, particularly with color-laden components, as the result of the improved mixing. This throttling effect of the slide can supplement the throttling effect (in the case of the aforementioned angular or deflecting mixing heads) of the control and cleaning piston located in the angular discharge tube. In the so-called straight line mixing heads with a discharge chamber extending in the axial direction of the mixing chamber and cleaned by the piston located in the mixing chamber, the throttling of the discharge chamber by the slide may be sufficient, so that further throttling devices in particular at the end of the mixing chamber may not be required.

Accordingly, in one embodiment of the present invention, there is thus provided an impingement mixing device comprising a mixing chamber housing, a control piston axially displaceable within said mixing chamber housing between an extended position and a retracted position, a mixing chamber within said housing defined by an end face of said control piston when in the retracted position and a mixing chamber discharge outlet coextensive with an end face of said control piston when in the extended position, means to feed a first component to said mixing chamber, means to feed a second component to said mixing chamber in opposing relationship to said first component, and a discharge tube housing defining a quieting chamber having an opening at a discharge end, said chamber being in fluid communication with said mixing chamber, the improvement wherein said discharge tube housing further includes sealing means adapted to at least partially close said opening of said quieting chamber at said discharge end.

In a second embodiment of the present invention there is further provided a process of impingement mixing comprising the steps of:

injecting first and second components into a mixing chamber in the form of opposing and impinging jets to form a first component mixture;

displacing said first component mixture from said mixing chamber to a quieting chamber;

displacing said mixture from said quieting chamber to a mold cavity through a discharge opening in said chamber;

injecting first and second components into said mixing chamber in the form of opposing and impinging jets to form a second component mixture; and displacing said second component mixture from said mixing chamber to said quieting chamber, the improvement wherein said first component mixture is retained in said quieting chamber subsequent to being displaced from said mixing chamber and during the formation of said second component mixture in said mixing chamber, and causing said first component mixture to be displaced from said quieting chamber by displacing said second component mixture from said mixing chamber into said quieting chamber.

BRIEF DESCRIPTION OF THE DRAWINGS

The Figures depict in cross-section an impingement mixing apparatus of the present invention in various stages of operation.

DETAILED DESCRIPTION OF THE INVENTION

Figure 1:
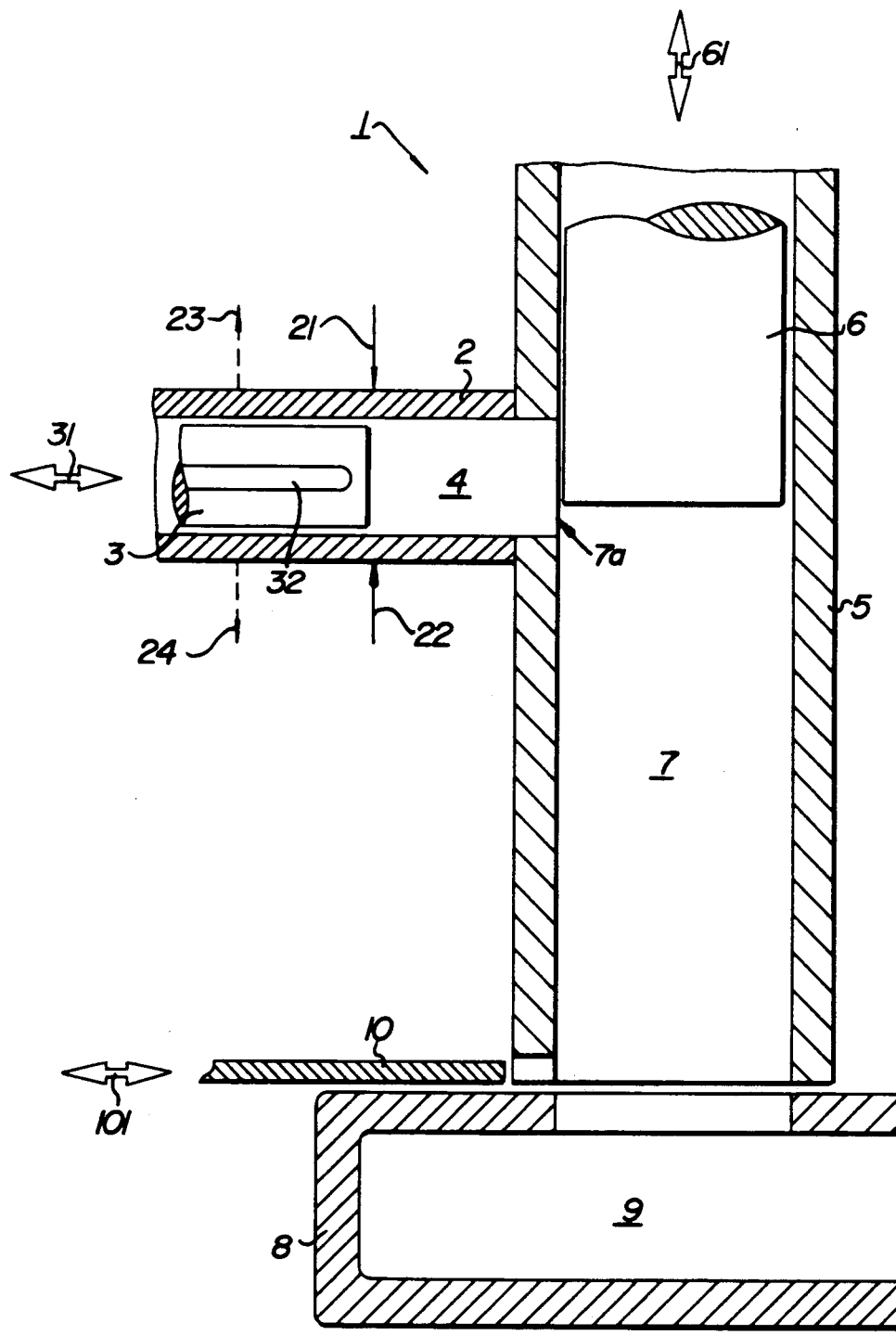

The invention is explained hereinbelow with reference to the drawings, which depict four stages of operation of a preferred embodiment of the mixing apparatus according to the present invention.

The angular mixing head 1 shown in FIGS. 1 to 4 includes a mixing cylinder 2, in which a first control and cleaning piston 3 is reciprocatingly mounted between an extended cleaning position and a retracted injection position. The hydraulic drive of the piston 3 (which causes the piston to reciprocate within chamber 4) is indicated schematically by the double arrow 31. Within the mixing cylinder 2, the space in front of the frontal surface of the piston 3 defines a mixing chamber 4, into which the opposing injection orifices 21 and 22 for two reactive components, for example isocyanate and polyol, open. As these orifices are located not in the plane of the drawing of FIGS. 1 to 4, but perpendicularly to it, the injection orifices 21, 22 are indicated by arrows only. Recirculation means 23 and 24 are provided in the mixing cylinder 2 together with the injection orifices 21 and 22.

As seen in the drawing, the positioning of the front edge of the piston 3 controls the opposing, high pressure injection of the two reactive components through the injection orifices 21, 22. As the piston 3 moves forward from its position shown in FIG. 1 to the position shown in FIG. 2, the injection orifices 21, 22 are closed off, corresponding to the completion of a "shot". Simultaneously, the piston 3 connects by means of longitudinal grooves 32 (of which only one is shown in the Figures since the radially opposite groove is hidden) the injection orifice 21 with the recirculation means 23 and the injection orifice 22 with the recirculation means 24. However, the conducting of the recirculation phase by means of longitudinal recirculation grooves 32 is not absolutely necessary (as other means are known), although it represents the most advantageous method of avoiding the presence of residues of the hardened reaction mixture in the mixing head 1.

A discharge tube 5 communicates with the mixing cylinder 2, the cross-section and length of which is preferably greater than the cross-section and the maximum length of the mixing chamber 4 (resulting in a greater volume), so that the turbulent component mixture passing at a high velocity from the mixing chamber 4 into the quieting chamber 7 may "quiet down" or become less turbulent and enter the mold cavity 9 of the casting mold 8 adjacent the discharge tube 5 in the form of a laminar jet. The discharge tube 5 preferably extends with its longitudinal axis at right angles to the longitudinal axis of the mixing chamber 4, which is the origin of the designation of an "angular mixing head" for the mixing apparatus shown in FIGS. 1 to 4. As the flow of the mixture is deflected 90° by the discharge tube 5, the designation of the mixing apparatus according to FIGS. 1 to 4 as a "deflecting mixing head" is appropriate.

Within the cylindrical discharge tube 5 a second control and cleaning piston 6 is reciprocatingly positioned, with the hydraulic drive means again indicated schematically only by the double arrow 61. The piston 6 defines an expansion or discharge chamber 7, which communicates by means of a throttling gap 7a with the mixing chamber 4. The throttling gap 7a is formed by the leading portion of piston 6 in the position shown in FIG. 2 which partially restricts the size of the discharge opening of the mixing chamber 4.

The angular mixing head 1 described to this point is generally known. According to the present invention, a slide means 10 is provided at the opening of the discharge tube 5, which slide means is connected with hydraulic drive means identified by the double arrow 101. The positions of the slide 10 associated with the different operating modes of the angular mixing head 1 are shown in FIGS. 1 to 4, in relation to the relative positions of the pistons 3 and 6.

Figure 2:
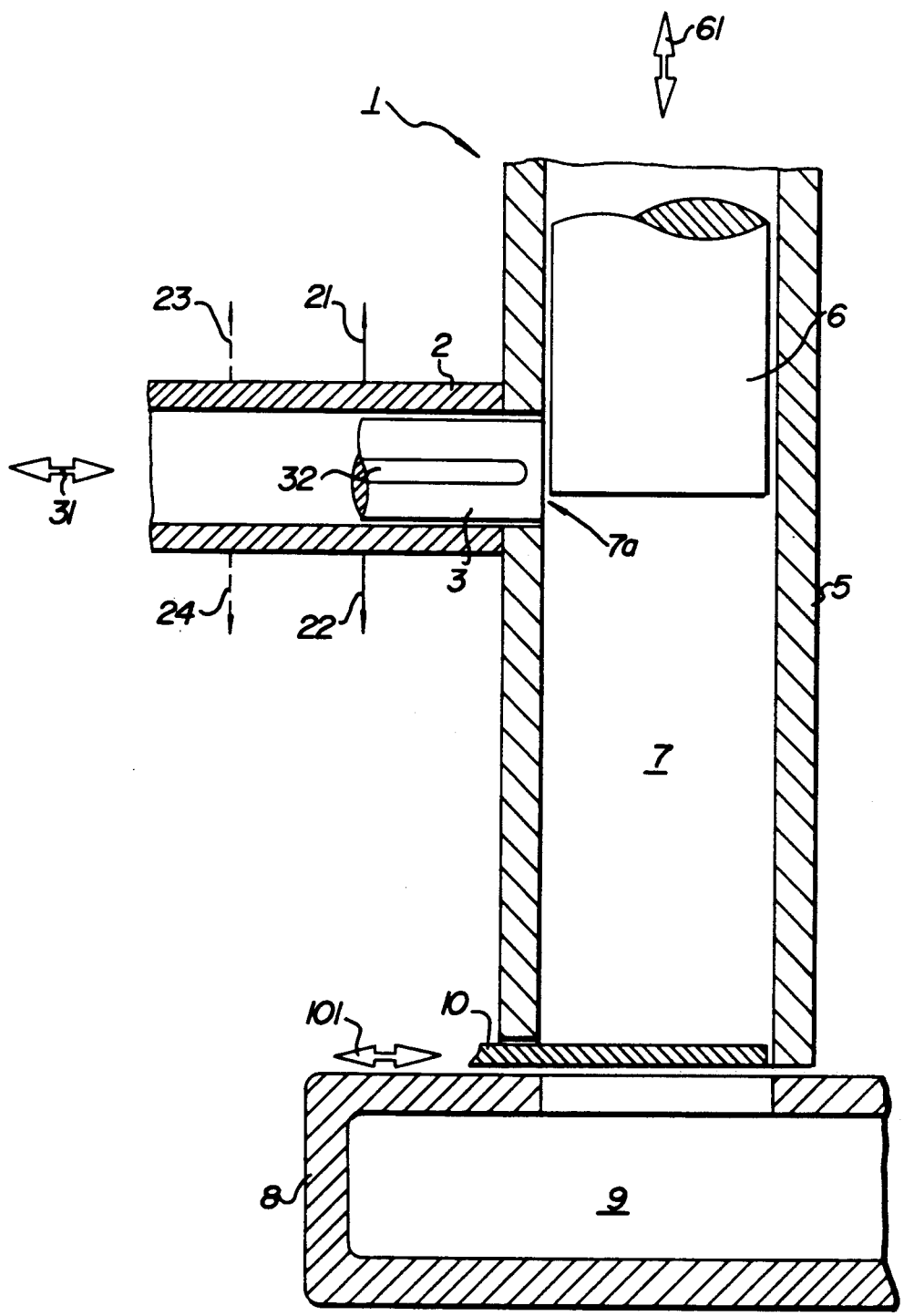

FIG. 1 shows the first operating mode; i.e., the initial mixing mode. In this mode, the position of the piston 3 permits injection of the reactive component via the injection orifices 21, 22. The piston 6 is in the throttling position relative to the opening of the mixing chamber 4. The sealing slide means 10 controlled synchronously with the piston 3 is in its retracted position, wherein it permits the discharge tube 5 to be completely open. This position of the pistons 3, 6 and the slide means 10 represents the initial position for the first "shot". During the first "shot" the chambers 4 and 7 are filled with air. After the injection of the reactive components, the piston 3 and the slide 10 are moved into the closed positions depicted at FIG. 2 in which the piston 3 is positioned with its front edge coextensive with the discharge opening of the mixing chamber 4 thereby completely discharging the residual reaction mixture from the mixing chamber 4; i.e., cleaning the mixing chamber 4. The slide means 10 completely closes the opening of the discharge tube 5. As seen in FIG. 2, in this second operating mode, the closed position, the mixture produced during the first "shot" is contained or retained in chamber 7, the mixture having displaced the column of air previously located in the chambers 4 and 7. The discharge opening of the discharge chamber remains at least partially open during the first injection mixing sequence to permit air present in the discharge chamber to be displaced by the resulting reaction mixture. However, movement of the slide is synchronized to coincide with the arrival of the first shot to retain the shot in the discharge chamber.

During the return stroke of the piston 3 (while the throttling position of the piston 6 remains unchanged) the piston 3 and the slide 10 again assume the position shown in FIG. 1, whereupon the next "shot" is carried out. The reaction mixture formed in this subsequent shot, because of the filling of the chamber 7 with the mixture from the preceding "shot", encounters not air but a quieted mixture, so that the inclusion of air in the reaction mixture that would occur otherwise is completely avoided. The expanding mixture of the second "shot" drives the mixture of the first "shot" which preceded it from the discharge chamber and into the cavity 9 of the mold, whereby as the result of the movement of the slide means 10 the discharge tube 5 is again completely blocked when the mixture of the second "shot" has arrived at the opening of the discharge tube 5. The filling of the mold cavity 9 thus initially takes place not synchronized with each "shot", but time delayed by the interval between two successive "shots".

Once the initial sequence of filling the discharge chamber occurs, subsequent shots and the movement of the slide are synchronized so that each successive shot displaces the preceding shot from the discharge chamber, with the slide movement resulting in the displacement of the prior shot from the discharge chamber into the mold and the retention of the subsequent shot in the discharge chamber.

Figure 4:
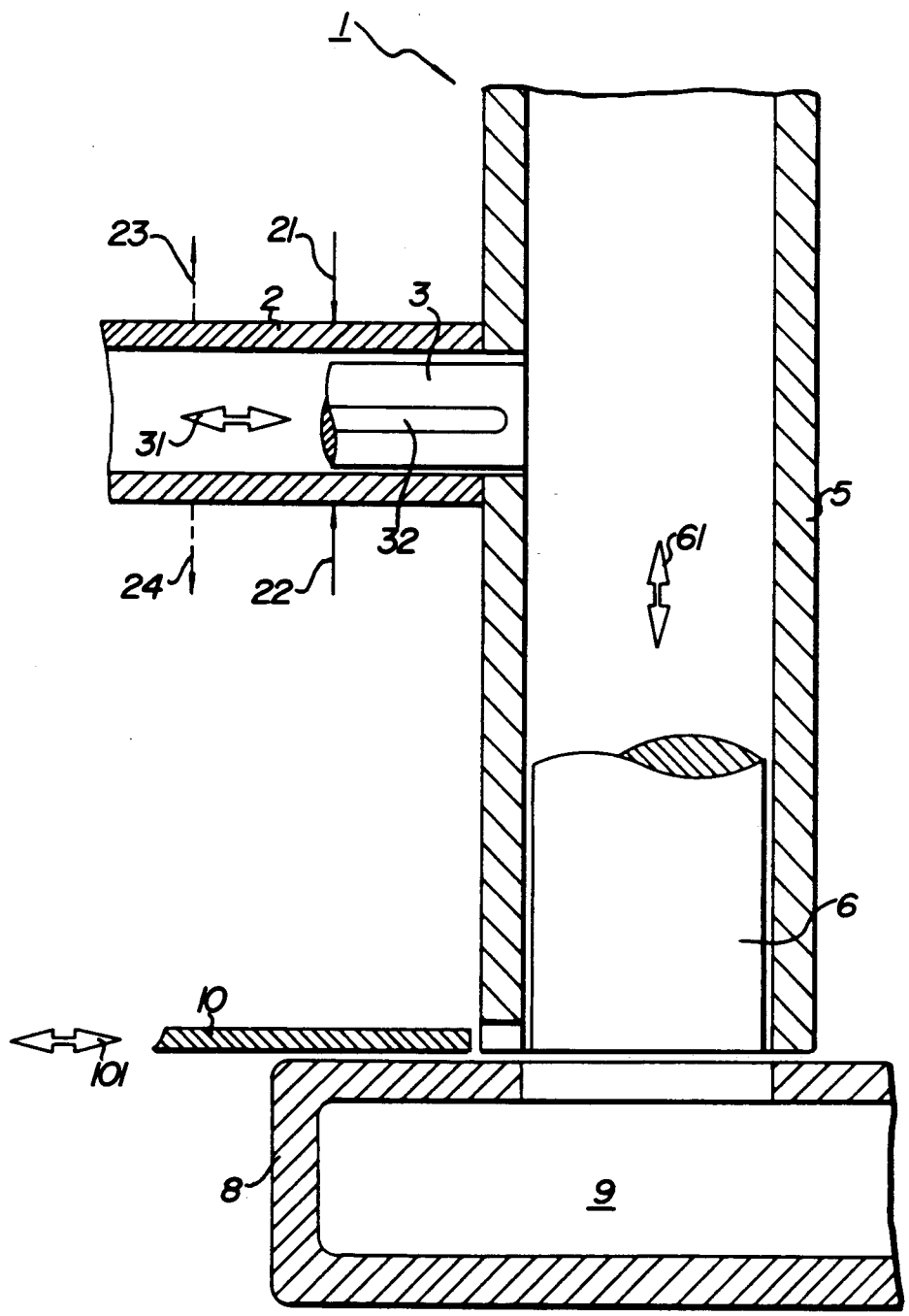

To clean the discharge tube 5 at the end of an operating cycle of the reaction mixture, in the third or cleaning mode shown in FIG. 4, the piston 6 is moved from its throttling position according to FIGS. 1 and 2 in the downward direction, so that its front edge aligns with the discharge opening of the discharge tube 5. In this position, the piston 3 is also in its cleaning position, while the slide means 10 is retracted and removed from the opening of the discharge tube 5.

Figure 3:
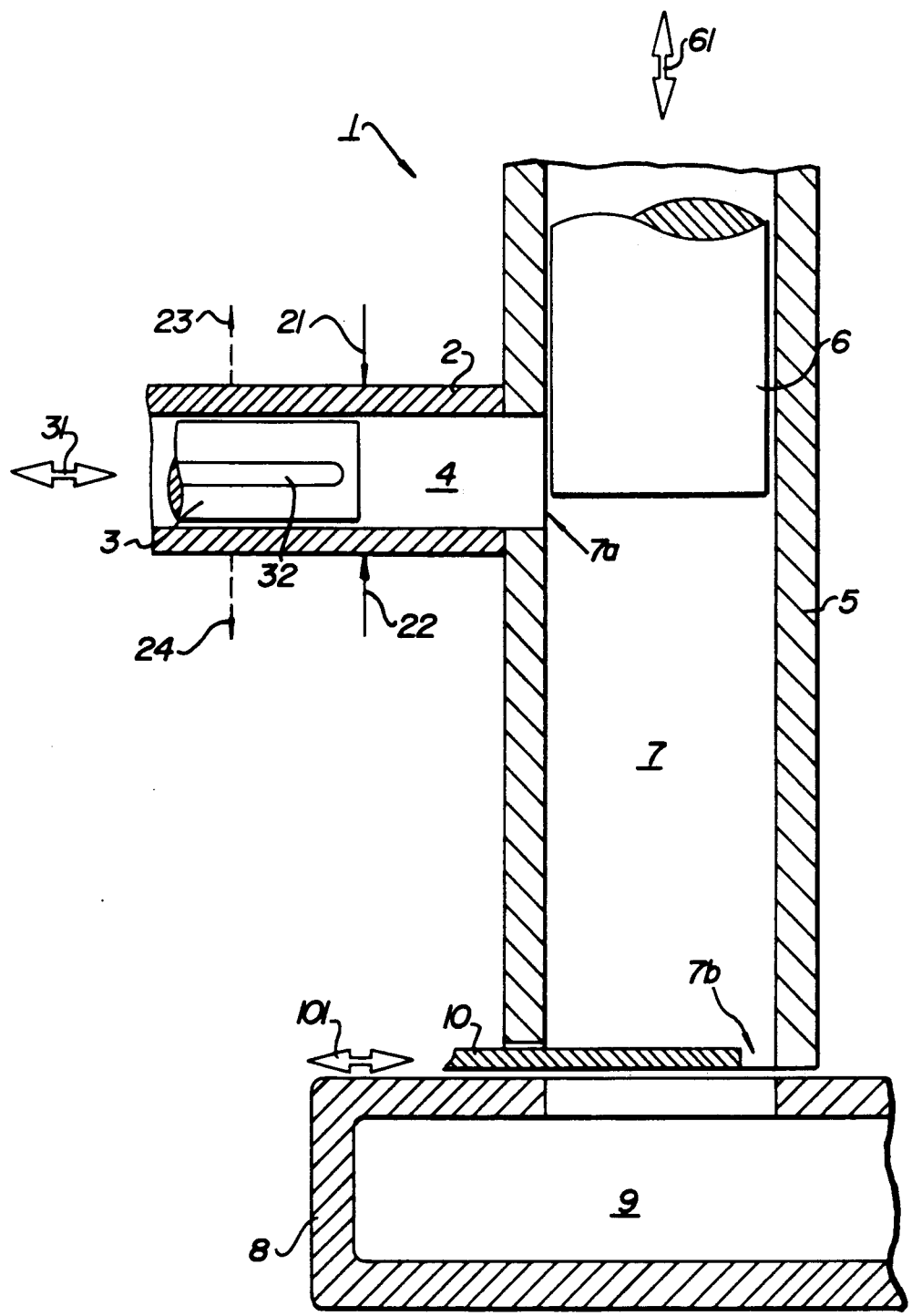

FIG. 3 shows a further mode of operation, in which the slide means 10 remains in its throttling position, together with the piston 6, while only the piston 3 reciprocates. In this embodiment, the slide means 10 defines a second throttle 7b which supplements the effect of the throttle 7a, thereby enabling an effective mixing of the reaction mixture to occur such as required, for example, in the processing of color loaded components in order to obtain a uniform coloration of the injection molded part.

The invention is not restricted to the application of angular mixing heads shown in FIGS. 1 to 4, but may also be used in the case of so-called straight line mixing heads in which the discharge tube extends along the same axis as the mixing chamber. The discharge chamber is cleaned in such straight line mixing heads by the action of the mixing chamber piston which performs a corresponding cleaning stroke to the opening of the discharge tube.

Another advantage of the present invention, in addition to the aforementioned avoidance of air inclusions particularly during the "start-up" of the mixing head is that no material can exit from the discharge chamber after the completion of the shot, which in the case of molding on round table installations with circularly distributed and continuously moving molds is important. In particular, during the production of shoe soles the avoidance of air inclusions, primarily in the frontal range of the injection jet, is highly advantageous, as this injection jet forms the outer edges of the shoe sole where air inclusions are particularly noticeable, thereby forcing a reworking of the outer edges.

What is claimed is:

1. A process of impingement mixing comprising the steps of:
   continuously injecting first and second components into a mixing chamber in the form of opposing and impinging jets to form a component mixture;
   displacing said component mixture from said mixing chamber to a quieting chamber;
   displacing said mixture from said quieting chamber to a mold cavity through a discharge opening in said chamber; and
   changing the size of said discharge opening during said injecting step.

2. In a process of impingement mixing comprising the steps of:
   injecting first and second components into a mixing chamber in the form of opposing and impinging jets to form a first component mixture;
   displacing said first component mixture from said mixing chamber to a quieting chamber;
   displacing said mixture from said quieting chamber to a mold cavity through a discharge opening in said chamber;
   injecting first and second components into said mixing chamber in the form of opposing and impinging jets to form a second component mixture; and
   displacing said second component mixture from said mixing chamber to said quieting chamber;
   the improvement wherein said first component mixture is retained in said quieting chamber subsequent to being displaced from said mixing chamber and during the formation of said second component mixture in said mixing chamber, and causing said first component mixture to be displaced from said quieting chamber by displacing said second component mixture from said mixing chamber into said quieting chamber.

3. The process of impingement mixing according to claim 10 wherein said first component mixture is retained in said quieting chamber by closing said discharge opening in said quieting chamber.

4. The process of impingement mixing according to claim 11 wherein said discharge opening is closed by slidably inserting a closure means across said discharge opening.

5. The process of impingement mixing according to claim 10 wherein said reaction mixture is displaced from said mixing chamber by axial displacement of a control piston within said mixing chamber.

6. The process of impingement mixing according to claim 10 wherein said first and second components are recirculated during displacement of said reaction mixture from said mixing chamber.

7. The process of impingement mixing according to claim 2 wherein said component mixture is displaced from said mixing chamber through a restricted opening at the discharge end of said mixing chamber.

8. The process of impingement mixing according to claim 2 wherein said component mixture is displaced from said quieting chamber through a restricted opening at the discharge end of said quieting chamber.

9. The process of impingement mixing according to claim 2 wherein said discharge opening of said quieting chamber is opened at the same time that said component mixture is displaced from said mixing chamber.

10. The process of impingement mixing according to claim 15 wherein said restricted opening is formed by partially displacing a quieting chamber piston across the discharge opening of said mixing chamber.

11. The process of impingement mixing according to claim 16 wherein said restricted opening is formed by partially displacing slidable closure means across the discharge opening of said quieting chamber.

* * * * *